(No Model.)
W. H. H. KNOWLTON.
FEED WATER HEATER.
No. 344,913. Patented July 6, 1886.
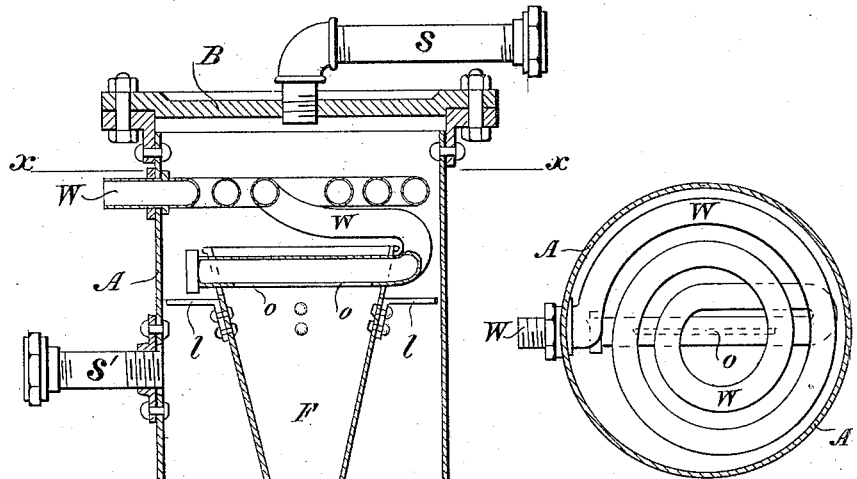
Fig. 2.
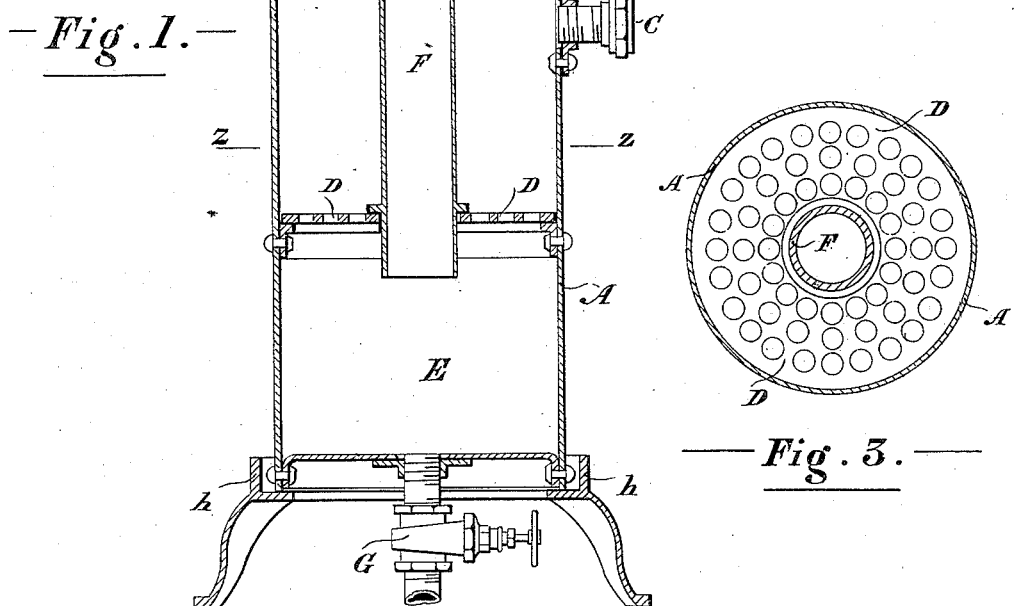
Fig. 1.
Fig. 3.
Witnesses:
Charles B. Lothrop
Sumner Collins
Inventor:
William H. H. Knowlton
by Geo. H. Lothrop
atty.

UNITED STATES PATENT OFFICE.

WILLIAM H. H. KNOWLTON, OF CHICAGO, ILLINOIS.

FEED-WATER HEATER.

SPECIFICATION forming part of Letters Patent No. 344,913, dated July 6, 1886.

Application filed April 3, 1886. Serial No. 197,712. (No model.)

*To all whom it may concern:*

Be it known that I, WILLIAM H. H. KNOWLTON, of Chicago, in the county of Cook and State of Illinois, have invented a new and useful Improvement in Feed-Water Heaters and Lime-Extractors, of which the following is a specification.

My invention consists in an improved feed-water heater and lime-extractor, hereinafter fully described.

Figure 1 is a vertical central section, and Figs. 2 and 3 are sections on the lines *x x* and *z z*, respectively, Fig. 1.

A represents a tank of any suitable shape, preferably made of iron, closed at top and bottom, and supported upon legs *h*.

S represents a pipe tapped through the top plate, B, of tank A, and adapted to lead steam from any suitable source into said tank.

F represents a funnel with its large end upward, suspended in any convenient manner in tank A, as by brackets *l*, or by having a flange thereon, which rests on a perforated plate, D, which extends across the tank A, near the lower end of the funnel F.

W represents a pipe, which leads into tank A at any point above the upper end of funnel F, is coiled around in said tank, and then opens into the upper end of funnel F by one or two narrow slots, or through perforations, as shown at *o o*.

S' represents a steam-outlet pipe leading out from the tank below the pipe W.

C represents a pipe leading out of the tank A to a pump or any other mechanism for feeding a boiler.

G represents a waste-pipe and valve in the lower end of the tank A.

E represents the lower end of the tank A, below the perforated plate D.

The operation of my invention is as follows: Water being admitted through the pipe W and steam through the pipe S, the water becomes heated by the steam and passes into the upper end of the funnel F, passes down through the funnel into the chamber E, where it leaves the lime and other impurities which have been separated from it by the action of the heat, and the clear water rises through the perforated plate D, leaving the heavier impurities at the bottom of the tank, and is drawn off through pipe C to be forced to the boiler. The pipe S' leads off to a pump or an injector, or any other machine using live steam, and thereby permits a constant steam circulation around the coiled pipe W, so that the water therein becomes very hot, which is an essential feature in extracting lime and other impurities therefrom. When no outlet is provided for the steam, circulation ceases, or at best proceeds only as fast as condensation takes place, and the water is not heated hot enough to thoroughly free it from impurities; and when the water and impurities descend through the funnel F they are delivered near the bottom of the tank, where there is no ebullition to cause the water to again take up the impurities, and the water rises gently and in a pure state through the perforated plate D to the feed-pipe C. If the funnel be suspended from the top the plate D may be omitted.

What I claim as my invention, and desire to secure by Letters Patent, is—

1. A feed-water heater consisting of a tank, a steam-pipe leading into the upper part of the tank, a funnel suspended in the tank, a water-pipe leading into the upper end of the funnel, a steam-outlet pipe, and a water-outlet pipe above the lower end of the funnel, substantially as shown and described.

2. In combination with the tank A, the steam inlet and outlet pipes S S', funnel F, water-pipe W, between said pipes S S' and leading into the funnel, perforated plate D, and water-outlet pipe C, substantially as shown and described.

3. In a feed-water heater, a steam-pipe and water-pipe in the upper part of the heater, a steam-outlet pipe below the water-pipe, and means for delivering the incoming water into the tank below the level of the water-outlet pipe, substantially as shown and described.

WILLIAM H. H. KNOWLTON.

Witnesses:
SUMNER COLLINS,
GEO. H. LOTHROP.